M. FRIZ.
ARRANGEMENT FOR RESILIENT POWER TRANSMISSION.
APPLICATION FILED AUG. 2, 1920.
1,375,688. Patented Apr. 26, 1921.
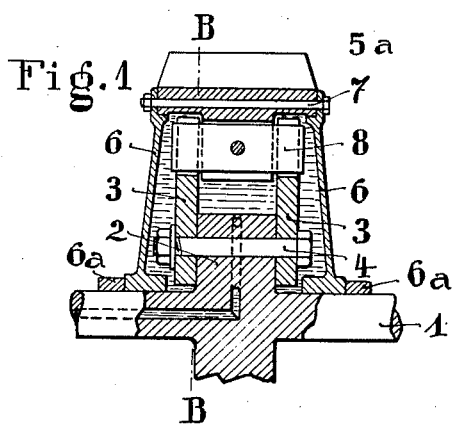
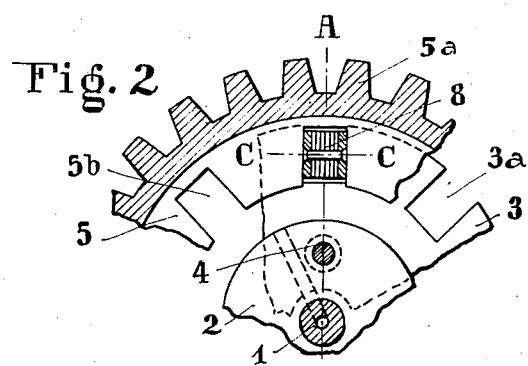
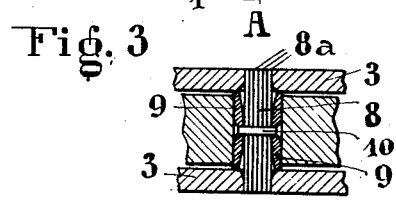
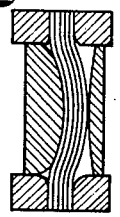 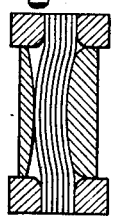 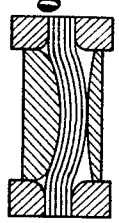 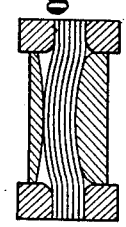
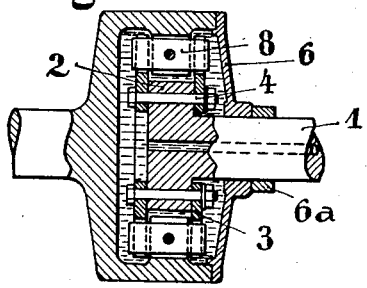
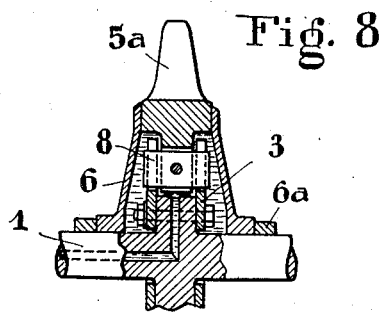
Inventor-
Max Friz.
By B. Singer,
Atty.

UNITED STATES PATENT OFFICE.

MAX FRIZ, OF MILBERTSHOFEN, NEAR MUNICH, BAVARIA, GERMANY, ASSIGNOR TO BAYERISCHE MOTOREN WERKE, AKTIENGESELLSCHAFT, OF MUNICH, BAVARIA, GERMANY.

ARRANGEMENT FOR RESILIENT POWER TRANSMISSION.

1,375,688.	Specification of Letters Patent.	Patented Apr. 26, 1921.

Application filed August 2, 1920. Serial No. 400,835.

*To all whom it may concern:*

Be it known that I, MAX FRIZ, a citizen of the German Republic, and a resident of Milbertshofen, near Munich, Bavaria, Germany, have invented certain new and useful Improvements in Arrangement for Resilient Power Transmission, of which the following is a specification.

In resilient power transmission by means of toothed gear, chain drive, clutches and the like, especially those rotating at high speed, resonance is frequently observed which, in connection with the accompanying vibrations and shocks is both undesirable and detrimental to the parts concerned. The object of the invention is to avoid the occurrence of such resonance and said object is attained by a particular arrangement and employment of intermediate resilient means between the driver and the driven and to counter-act any further injurious vibrations and shocks which may still take place by means of suitable damping arrangements, such as liquid dampers.

The invention will hereinafter be explained by reference to a resilient power transmitting device of substantially known type in which the transmission is effected by the interposition between the driver and the driven of leaf springs, or leaf spring packets respectively placed around the shaft and parallel to the same.

By suitably arranging these interposed resilient packings according to the invention the conditions for resonance or vibrations are removed as far away as possible from the normal number of revolutions of the parts. Since, in certain machines, for example in connection with aerial motors, temporary alterations in the number of revolutions take place which may have their reason in the cited example by temporary disturbances affecting the revolutions of the propeller, for instance in the failure of one of the cylinders or owing to spark failure, the rhythm of the power impulses or, as it is commonly called, the "hum" of the engine may temporarily change. Such changes may, however, also take place on account of the aforesaid reasons even when the number of revolutions remains constant and it is quite possible that, in spite of the aforementioned measures, injurious vibrations and shocks would still occur. In order to destroy these as far as possible, liquid damping or shock absorbing means are employed in accordance with this invention.

The means for removing the conditions for such resonance as far away as possible from the normal number of revolutions by suitably arranging the resilient packings as stated above in its outlining features, consists in imparting to the various springs or spring packets different tensions, said tensions differing not only in their direction but also in their magnitude; that is to say, one of the springs or spring packets is tensioned in clockwise direction and another in anti-clockwise direction, one with a greater tension and another with a smaller amount of tension, and so forth, the arrangement being preferably irregular and it does not follow any certain rule or law.

Any vibrations and shocks which may yet occur in spite of the aforesaid arrangement will subsequently be destroyed or at least rendered uninjurious by means of liquid damping, for which purpose the lubricating oil may conveniently be used.

One way of carrying out the invention is illustrated in the accompanying drawings, in which—

Figure 1 shows the application of the invention to a toothed gear coupling and is a section on line A—A of Fig. 2.

Fig. 2 is a section on line B—B of Fig. 1.

Fig. 3 illustrates the position of one of the spring packets in section along the line C—C of Fig. 2.

Figs. 4 to 7 illustrate different arrangements of leaf spring packets.

Fig. 8 shows the application of the invention to a chain wheel.

Fig. 9 illustrates a resilient section or coupling as constructed in accordance with the invention.

In these drawings (Figs. 1 to 3) 1 denotes the shaft of the driving part having a collar 2 to which rings 3 are secured by means of bolts 4, said rings being provided with recesses 3$^a$ along their circumference. An annular gear wheel 5 is circumferentially interposed between the rings 3 and has a number of outer teeth 5$^a$ as well as a number of internal recesses 5$^b$. It is maintained in its position concentric to the shaft 1 by means of flanges or disks 6 which are secured against displacement upon the shaft by the provision of adjusting rings 6ª. Before fixing the two disks 6 the leaf spring packets are interposed between the recesses of the rings 3 and the notches 5ᵇ of the annulus 5. Fig. 3 clearly shows the position of the separate springs 8ª in relation to the driving and the driven parts. A boss-like member 9 is arranged at each side of each spring packet and these members are connected to the springs 8ª by means of a bolt or rivet 10 so as to form one entirety. In order to suit the said bosses to the shape of the springs when the latter are being bent under the stress of the gear, their inner surfaces are curved as will be seen from Figs. 4 to 7. On account of the same reasons the notches 3ª of the rings 3 are extended in the direction of the toothed annulus 5. (Fig. 3.)

In the various forms of spring packets shown in Figs. 4 to 7 a differently directed tension is indicated as also a different magnitude of tension. These differences may be produced for example by arranging the notches in the annulus 5 at differing distances with regard to those of the rings 3, but for the sake of simplicity this object may be attained by the bosses 9 being made of two thicknesses as indicated in Figs. 4 to 7, so that equally spaced recesses might be provided in the rings 3 as well as in the toothed annulus 5. The damping liquid is received according to the invention within the entire space which is inclosed between the disks or flanges 6 and the annulus 5. Preferably oil is used for this purpose, which would also lubricate the bearing surfaces of the two disks upon the shaft 1. A damping action would take place in as much as, under the work of the spring packets, the oil would be squeezed out of the space formed by the curved surfaces of the bosses 9 and the spring packets through the extended parts of the notches 3ª. This, being a forced procedure, would effectually damp any undue vibrations of the parts involved, and its effect can be increased according to requirements by further closing up and narrowing the space around the spring packets.

A change of the used up oil can be attained by the constant addition of a small quantity of fresh oil into the working space of the gear and this may be effected for example by means of a small tube carried into said space or by a drill hole through the said shaft 1.

The prevention of the injurious effects produced by the resonance and by shocks and vibrations in resilient power transmission as described in the above example may be attained in the same or in a similar way in connection with chain gear, clutches and other power transmitting devices. In the first case the annulus 5 of the given example need only be replaced by the toothed annulus of a chain- or sprocket-wheel as shown in Fig. 8 and in the latter case the driving parts 2 and 3 will have to be fixed to the driving shaft, and the driven parts 5 and 6 to the end of the driven shaft of the clutch, Fig. 9; the various parts will of course have to be constructed so as to suit the requirements of each particular case, but this would not affect the invention which, moreover, might be subjected to any deviations or modifications that may be required within the scope of the following claims.

What I claim is:—

1. In an arrangement for the prevention of injurious resonance effects in connection with resilient power transmission, a driving part, a driven part, and interposed means for resiliently transmitting the power from the driver to the driven, said means being of differing tension as regards direction and magnitude.

2. In an arrangement for the prevention of injurious resonance effects in connection with resilient power transmission, a driving part, a driven part, and a number of interposed springs for resiliently transmitting the power from the driver to the driven, said springs being of differing tension as regards direction and magnitude.

3. In an arrangement for the prevention of injurious resonance effects in connection with resilient power transmission, a driving part, a driven part, and a number of interposed spring packets for resiliently transmitting the power from the driver to the driven, said spring packets being of differing tension as regards direction and magnitude.

4. In an arrangement for the prevention of injurious resonance effects in connection with resilient power transmission, a driving part, a driven part, recesses in said driving and said driven part, and resilient means with a differently directed tension with regard to each other being positioned in the recesses of the said parts.

5. In an arrangement for the prevention of injurious resonance effects in connection with resilient power transmission, a driving part, a driven part, recesses in said driving and said driven part, and resilient means with a tension of differing magnitude with regard to each other being positioned in the recesses of the said parts.

6. An arrangement for the prevention of injurious resonance effects in connection with resilient power transmission such as toothed gear, chain gear and similar power transmitting devices, having in combination a driving part, a driven part, recesses in said driving and said driven part, spring packets, being arranged in said recesses and having a differently directed tension with regard to each other, and bosses to hold the said spring packets together.

7. An arrangement for the prevention of injurious resonance effects in connection with resilient power transmission such as toothed gear, chain gear, clutches and similar power transmitting devices, having in combination a driving part, a driven part, recesses in said driving and said driven part, spring packets arranged in said recesses and being of different tension with regard to each other, and bosses of unequal thickness to hold the springs in the said spring packets together.

8. An arrangement for the prevention of injurious resonance effects in connection with resilient power transmission such as toothed gear, chain gear, clutches and similar power transmitting devices, having in combination a driving part, a driven part, recesses in said driving and said driven part, spring packets arranged in said recesses and being of differently directed tension and of differing magnitude with regard to each other, bosses to hold said spring packets together, and tightly fitting flanges to close in said parts and to form a chamber for the reception of a shock absorbing liquid.

9. An arrangement for the prevention of injurious resonance effects in connection with resilient power transmission such as toothed gear, chain gear, clutches and similar power transmitting devices, having in combination a driving part, a driven part, recesses in said driving and said driven part, spring packets arranged in said recesses and being of differently directed tension and of differing magnitude with regard to each other, bosses to hold said spring packets together, tightly fitting flanges to close in said parts and to form a chamber for the reception of a shock absorbing liquid, and curved inner surfaces to the said bosses forming passages for the shock absorbing liquid in the manner described.

In witness whereof I affix my signature.

MAX FRIZ.

Witnesses:
  BRUNO KATZ,
  EMIL FRIZ.